United States Patent [19]

Hatakeyama et al.

[11] Patent Number: 4,518,554
[45] Date of Patent: May 21, 1985

[54] METHOD AND APPARATUS FOR MOLDING A TUBULAR CONTAINER WITH A CAP

[75] Inventors: Yoshiharu Hatakeyama, Tokyo; Tatsuo Ishikawa; Kenzo Teshima, both of Chiba, all of Japan

[73] Assignee: Yoshida Industry Co., Ltd., Tokyo, Japan

[21] Appl. No.: 529,877

[22] Filed: Sep. 6, 1983

[30] Foreign Application Priority Data

Sep. 14, 1982 [JP] Japan ............... 57-158836

[51] Int. Cl.³ ............ B29C 5/00; B29C 1/00; B29F 1/022
[52] U.S. Cl. .................... 264/262; 264/268; 425/117; 425/127; 425/129 R; 425/577
[58] Field of Search ........... 264/DIG. 41, 262, 267, 264/268, 242, 318; 425/117, 127, 129 R, 577

[56] References Cited

U.S. PATENT DOCUMENTS

| | | | |
|---|---|---|---|
| 2,386,498 | 10/1945 | Ostrander | 264/DIG. 41 |
| 2,777,164 | 1/1957 | Strahm | 264/DIG. 41 |
| 2,945,266 | 7/1960 | Mainardi | 264/268 |
| 2,947,035 | 8/1960 | Baker | 264/DIG. 41 |
| 3,020,594 | 2/1962 | Makowski | 425/129 |
| 3,629,385 | 12/1971 | Badavas et al. | 264/DIG. 41 |
| 3,988,413 | 10/1976 | Gaudet et al. | 264/DIG. 41 |

FOREIGN PATENT DOCUMENTS

| | | | |
|---|---|---|---|
| 695149 | 9/1964 | Canada | 264/DIG. 41 |
| 579834 | 6/1958 | Italy | 264/DIG. 41 |

Primary Examiner—Willard E. Hoag
Attorney, Agent, or Firm—Wenderoth, Lind & Ponack

[57] ABSTRACT

A tubular container is molded with a cap by defining; at least one portion of a cavity for molding a neck portion between a female die for receiving a cap having a screw on the inside thereof and a male die having a fixed guide rod for insertion into the cap centrally thereof. A top end portion of a preformed container body is partly inserted into the cavity. A synthetic resin, which possesses compatibility with the container body and is not fused together with the cap, is injected into the cavity to form the neck portion integrally with the container body.

4 Claims, 5 Drawing Figures

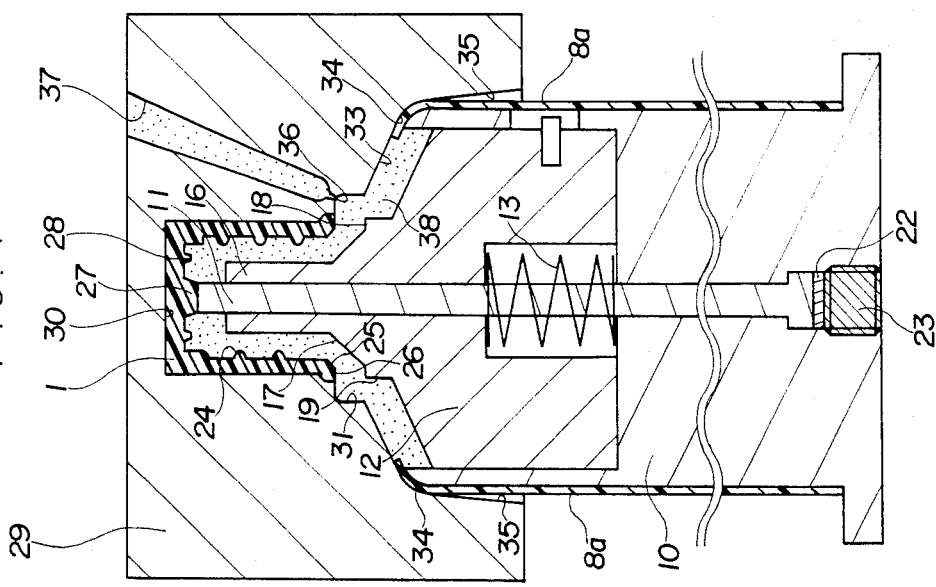
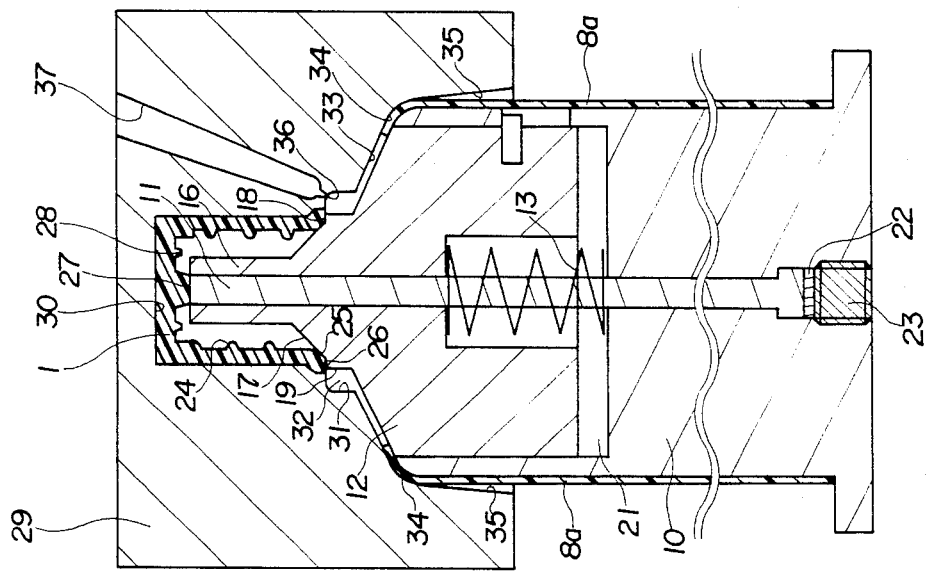

METHOD AND APPARATUS FOR MOLDING A TUBULAR CONTAINER WITH A CAP

BACKGROUND OF THE INVENTION

The present invention relates to a method and apparatus for molding a resin-made tubular container with a cap for cosmetics or the like, and more particularly to a method and apparatus which permits simultaneous molding of a cap on a tubular container during the molding of the latter.

In the manufacture of a tubular product containing cosmetics, a premolded tubular container with its bottom open and having threadably attached thereto a cap is carried in an inverted position and the cosmetics or the like is filled into the container from the open end, and finally the open end is subjected to heat sealing or high-frequency sealing. Accordingly, since the tubular container is filled with the contents after it is closed by a cap, unlike other ordinary containers, the filling and sealing operation are simple, and hence the tubular container is suitable for high efficiency production through automation.

It is customary in the prior art, however, to mold the tubular container and the cap separately and then to threadably engage the cap with the neck of the tube. In this case, since the tubular container is relatively soft and does not stand by itself, a device and a step for holding the tubular container in a standing position are needed for achieving threaded engagement with the cap.

SUMMARY OF THE INVENTION

It is therefore an object of the present invention to provide a method and apparatus which eliminate the device and the step for threadably attaching a cap to a tubular container, and hence permit simplification of the manufacturing process of tubular products.

According to the present invention, a cap having screw threads preformed on the inside thereof is disposed in a cavity of a die for molding a tubular container, and molten thermoplastic resin, which is not fused together with the cap, is injected into the cavity to form a screwed neck portion on the inside of the cap serving as a die therefor, thereby molding a tubular container with the cap.

BRIEF DESCRIPTION OF THE DRAWINGS

FIGS. 2 to 4 are cross-sectional views illustrating a sequence of steps involved in the molding of the tubular container with a cap through the use of an apparatus of the present invention.

DETAILED DESCRIPTION OF THE PREFERRED EMBODIMENTS

Figure 1:
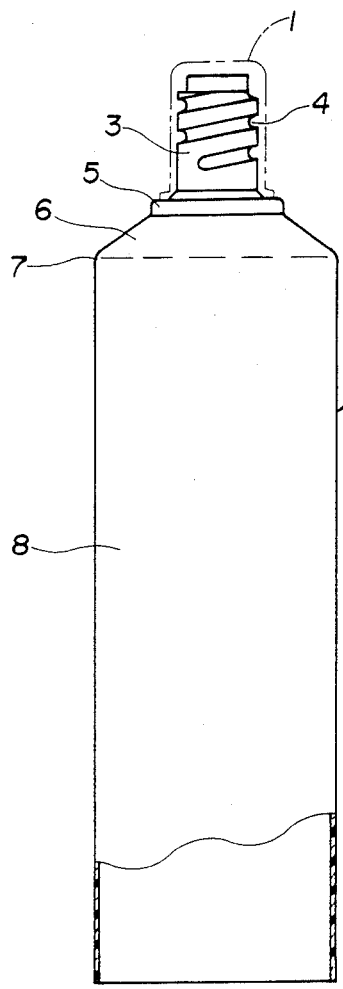
FIG. 1 is a front view, partly broken away, showing a tubular container with a cap made according to the present invention, with the cap being indicated by a chain line.

FIG. 1 is a front view illustrating, partly in section, a tubular container with a cap which is molded by the molding method of the present invention. The cap, identified by numeral 1, is shown by the one-dot chain line. A neck portion 3 of a tubular container, indicated generally by 2, has a screw thread 4 for threaded engagement with the cap 1. At the lower end of the neck portion 3 is formed a flanged base 5, which is contiguous to a conical shoulder portion 6, the lower end of which is fused together with a tubular body 8 at the portion indicated by 7. The body 8 is formed of a highly pliable synthetic resin which is freely deformable by the fingers of a user, and the bottom of the body 8 is opened for packing thereinto its contents. The screw thread 4 on the neck portion 3 of the tubular container 2 is formed as a screw groove, and the flanged base 5 has a larger diameter than the outer diameter of the cap 1 so that the lower open end of the latter may make close contact with the former.

Figure 2:
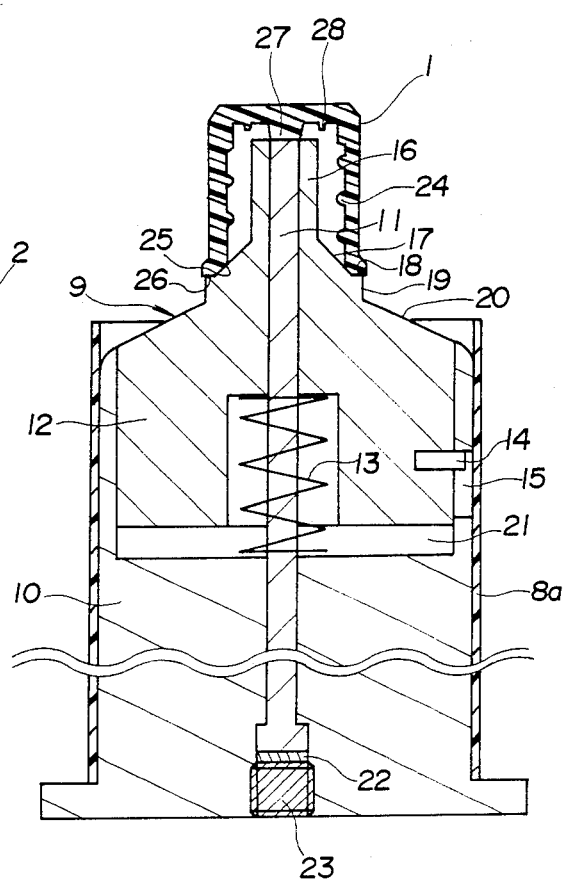

FIGS. 2 to 4 show an apparatus for molding such a tubular container with a cap. FIG. 2 is a sectional view showing such a state that the cap 1 and the tubular body 8 are mounted on a male die 9. The male die 9 comprises a core 10 the upper portion of which is hollow and sleeve-shaped, a fixed guide rod 11 inserted into the core 10 centrally thereof to project upwardly therefrom, and a sliding die member 12 mounted in the upper hollow portion of the core 10 coaxially with the fixed guide rod 11 in a manner to be slidable up and down along the guide rod 11. Between the core 10 and the sliding die member 12 is installed a compression spring 13, by which the sliding die member 12 is always biased upwardly. A stopper key 14 protrudes from the side of the sliding die member 12 and is adapted to enter an elongated hole 15 made in the sleeve-like side wall of the core 10 and to abut against the upper end face of the hole 15 for limiting the upward movement of the sliding die member 12. The upper end face of the elongated hole 15 is positioned so that at the raised position of the sliding die member 12 its upper end surface and that of the fixed guide rod 11 will be flush with each other.

The upper portion of the sliding die member 12 forms a small-diametered cylindrical portion 16, which is contiguous at its lower end to a frustoconical portion 17, the lower marginal portion of which forms a stepped portion 18 and is contiguous through a vertical wall 19 to a relatively gently sloping shoulder 20. The shoulder portion 20 is shaped so that it will be in alignment with the upper end face of the core 10 at the raised position of the sliding die member 12. Between the sliding die member 12 and the inner bottom of the core 10 is provided a space 21 which permits the downward movement of the sliding die member 12, and the height of the space 21 is selected to be equal to the thickness of the shoulder portion 6 of the tubular container 2 which is molded by a method described below.

The fixed guide rod 11 is supported at its lower end by an elastic cushion 22 for a reason described below, and a blind stopper 23 is screwed into the core 10 to support the elastic cushion 22.

A tubular member 8a forming the tubular body 8 of the tubular container is held in close contact with the outer peripheral surface of the core 10, with the upper end portion of member 8a extending 2 to 3 mm higher than the upper end of the core 10. On the top of the fixed guide rod 11 is mounted a premolded cap 1 with its open end downward. The inner diameter of the cap 1 is substantially larger than the outer diameter of the sliding die member 12, and screw threads 24 protrude inwardly from the inner peripheral surface of the cap 1. The lower open end portion of the cap 1 has a tapered portion 25 of the same angle as the slope 17 of the sliding die member 12 and a flat flanged portion 26. When placed on the top of the fixed guide rod 11, the cap 1 is centered relative thereto and the flat flanged portion 26 is seated on the stepped portion 18 of the sliding die member 12. An inverted frustoconical projection 27 is formed on the inner bottom of the cap 1 centrally thereof to extend downwardly and is in contact with the upper end face of the fixed guide rod 11, and a circular projecting lug 28 is formed to surround the projection 27.

After the cap 1 and the tubular member 8a forming the tubular container are mounted on the male die 9 as illustrated in FIG. 2, a female die 29 is clamped against the male die 9 as shown in FIG. 3. The female die 29 has a centrally disposed cavity 30 which snugly engages the entire peripheral surface of the cap 1. The female die 29 is arranged so that when it is clamped against the male die 9, the cap 1 is automatically received by the cavity 30 and the inner central projection 27 of the cap 1 is urged against the upper end face of the fixed guide rod 11. In this case, since the elastic cushion 22 is provided at the lower end of the fixed guide rod 11, even if dimensions of the cap 1 are not precisely correct, the fixed guide rod 11 is cushioned to absorb such dimensional errors. The lower portion of the cavity 30 of the female die 29 has a stepped portion, which forms a flange-shaped recess 31 to define a space 32 between it and the vertical wall 19 of the sliding die member 12 in the state shown in FIG. 3. The lower end portion of the flanged recess 31 is contiguous to an outwardly sloping recess 33 which is frustoconical in section and the slope of which extends substantially parallel to the shoulder portion 20 of the sliding die member 12. The lower end portion of the sloping recess 33 further extends through a curved surface 34 down to an acutely spreading tapered portion 35. Accordingly, upon clamping the female die 29 against the male die 9 as shown in FIG. 3 in such a state that the tubular member 8a which will ultimately form the body of the tubular container projects upwardly of the upper end of the core 10 as illustrated in FIG. 2, the projecting upper end portion of the tubular member 8a is bent along the curved surface 34 and held between the sloping recess 33 of the female die 29 and the upper end of the core 10.

A pouring gate 36 opens into the flange-shaped recess 31 of the female die 29 which defines the aforementioned space 32, and the pouring gate 36 communicates with a sprue runner 37 which extends up through the female die 29. Molten thermoplastic resin is injected through the sprue runner 37 and the pouring gate 36 into the space 32 defined between the female die 29 and the sliding die member 12.

In the present invention, the cap 1 is formed of a resin which is not melted by the heat of the injected molten resin for molding the neck portion 3 of the tubular container, that is, a resin which is not fused with the injected resin, such as, for example, thermosetting urea or melamine resin, or thermoplastic AS, ABS or polycarbonate resin. Further, the tubular member 8a may preferably be a flexible pipe formed of an olefine resin. On the other hand, it is preferable that the resin for molding the neck portion 3 be polyethylene, EVA resin or Ionomer resin which has a low melting point and which is highly pliable has a and large degree of mold shrinkage so as to obtain good threaded engagement of the neck portion 3 with the cap 1. Incidentally, the injected resin must be compatible with the resin of the tubular member 8a so that it fuses the upper end portion of the latter by its heat and, after cooling, they are integrally molded.

When such a thermoplastic resin as mentioned above is injected into the space 32 through the sprue runner 37 and the pouring gate 36 in such a state as shown in FIG. 3, the sliding die member 12 is pressed down by the pressure of the injected resin 38 against the spring 13 to form a gap between the lower open end 26 of the cap 1 and the stepped portion 18 of the sliding die member 22. Consequently, the molten resin 38 flows from the abovesaid gap into the space defined by the inner surface of the cap 1, the upper end portion of the fixed guide rod 11 and the cylindrical portion 16 and the slope 17 of the sliding die member 12. Further, since the sliding die 12 is forced downwardly by the pressure of the injected resin 38 as mentioned above, the air gap including the space 32 between the female die 29 and the sliding die member 12 is enlarged, and the molten resin 38 also flows into this air gap, in which it is fused together with the upper end of the tubular body 8a so that they are integrally molded. In this way, the injected molten resin 38 integrally forms the neck portion 3, the flanged base 5 and the shoulder portion 6 of the tubular container 2, and this unitary structure is fusion welded with the tubular member 8a forming the body of the container 2. Since the cap 1 is formed of a resin having a higher melting point than that of the molten resin 38, it is not melted by the heat of the latter, and therefore, the neck portion 3 is not fused together with the cap 1. The molded neck portion 3 has formed therein the screw groove 4 complementary to the screw thread 24 of the cap 1, and the mouth of the neck portion 3 is formed by the fixed guide rod 11 and the projection 27 of the cap 1.

Figure 5:
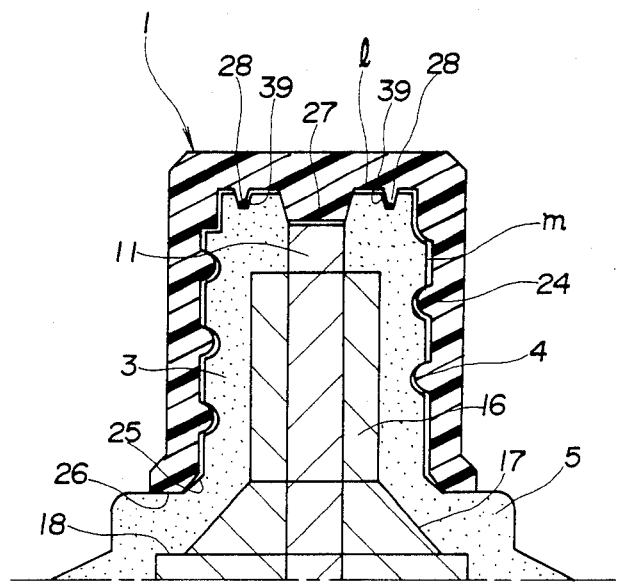
FIG. 5 is a cross-sectional view showing on an enlarged scale the cap and the neck portion of the tubular container of FIG. 1.

Next, a description will be given, with reference to FIG. 5, of the hermetic sealing of the tubular container 2 by the threaded engagement of the neck portion 3 with the cap 1.

The molten resin 38 injected into the space inside the cap 1 shrinks as a result of its solidification by cooling to form a gap m between the outer peripheral surface of the neck portion 3 and the inner peripheral surface of the cap 1 and a gap l between the top end face of the neck portion 3 and the inner surface of the top wall of the cap 1. Accordingly, the cap 1 can freely be threadedly engaged with or disengaged from the neck portion 3. Moreover, since the screw groove 4 is formed in the neck portion 3 corresponding to the screw thread 24 of the cap 1, even if the resin forming the neck portion 3 shrinks in the radial direction thereof to form the gap m as described above, this does not matter. The reason for this is as follows: Since the flat flanged portion 26 at the open end of the cap 1 is in abuttment with the flanged base 5 of the neck portion 3 in the longitudinal direction thereof, when the neck portion 3 shrinks in its longitudinal direction, its screw groove 4 compresses the screw thread 24 of the cap 1 to produce the same effect as would be obtained by tightening the screw, thus eliminating the possibility of the cap 1 becoming loose. As regards the hermetic sealing, the gap l is formed between the top end face of the neck portion 3 and the inner surface of the cap 1. But since a circular groove 39, which is formed corresponding to the circumferentially projecting lug 28 on the interior surface of the cap, shrinks in its radial direction, the outer wall of the groove 39 presses against the outer surface of the projecting lug 28 to provide a hermetic seal. At the same time, the mouth of the neck portion 3 is also pressed by the inner central projection 27 of the cap 1 owing to the shrinkage of the neck portion 3 in its radial direction and is thereby hermetically sealed. Thus a double hermetic seal is achieved.

As has been described in the foregoing, according to the present invention, a tubular container with a cap threadably attached thereto in a hermetic manner is formed simultaneously with the molding of a neck portion of the container. Accordingly, the present invention eliminates the operation and apparatus of holding a premolded tubular container for threadably attaching thereto a separately molded cap, and hence it permits simplification and rationalization of the manufacturing process of tubular products.

Incidentally, in such a case where the sliding die member 12 is mounted in the male die 9 and after placing the premolded cap 1 on the sliding die member 12, the female die 29 is clamped against the male die 9 and then molten thermoplastic resin is injected between the female die 29 and the sliding die member 12 to mold the tubular container with the cap as described in the foregoing, the cap 1 can easily be positioned or predetermined without involving any complex device therefor. This also permits simplification of the apparatus and the reduction of the manufacturing costs of the products.

It will be apparent that many modifications and variations may be effected without departing from the scope of the novel concepts of the present invention.

What is claimed is:

1. A method for molding a resin-made container with a cap, said method comprising:
    providing a female die having a cap-receiving recess, and a male die having a fixed guide rod and a sliding die member movable along said guide rod and urged outwardly therealong;
    inserting a cap having internal threads into said recess of said female die, with an open end of said cap facing outwardly of said recess;
    inserting said male die into said female die and thereby centrally inserting said guide rod into said cap, clamping an outer end portion of a premolded container body provided about said male die between said dies, and defining a cavity portion between said sliding die member and the inner surface of said cap and another cavity portion between said dies; and
    injecting a synthetic resin, which is compatible with said container body but which will not fuse with said cap, into said another cavity portion, and by the injection pressure forcing said sliding die member along said guide rod away from said female die, thereby enlarging said another cavity portion, and molding in said cavity portions a container neck within said cap and an integral container shoulder fused with said outer end.

2. An apparatus for molding a resin-made tubular container with a cap, said apparatus comprising:
    a female die having a recess for receiving a cap having a screw on the inside thereof and an enlarged recess contiguous to said recess for defining an outer peripheral surface of a shoulder of a container;
    a male die having a fixed guide rod for insertion into said cap centrally thereof and to be urged thereagainst and a sliding die member slidable up and down along said fixed guide rod; and
    means for injecting molten thermoplastic resin under pressure into a space for holding an upper end portion of a container body between said enlarged recess of said female die and an outer peripheral portion of said male die and into a space between said female die and said sliding die member.

3. An apparatus according to claim 2, wherein said sliding die member is biased by a resilient spring towards an open end portion of said cap; an upper portion of said sliding die member has a conical slope; when said cap is mounted on said fixed guide rod from above, said lower open end of said cap is guided on said conical slope so that said cap may be centered relative to said fixed guide rod; and when the molten thermoplastic resin is injected between said female die and said sliding die by said injecting means after clamping said female die against said male die, said sliding die member is brought down out of contact with said lower open end of said cap against said spring.

4. An apparatus according to claim 3, wherein said fixed guide rod is supported at its lower end by an elastic cushion.

* * * * *